June 11, 1968  K. R. BOCKENSTETTE  3,387,740
REINFORCED PLASTIC BAKERY TRAY AND THE LIKE
Filed June 22, 1967  2 Sheets-Sheet 1
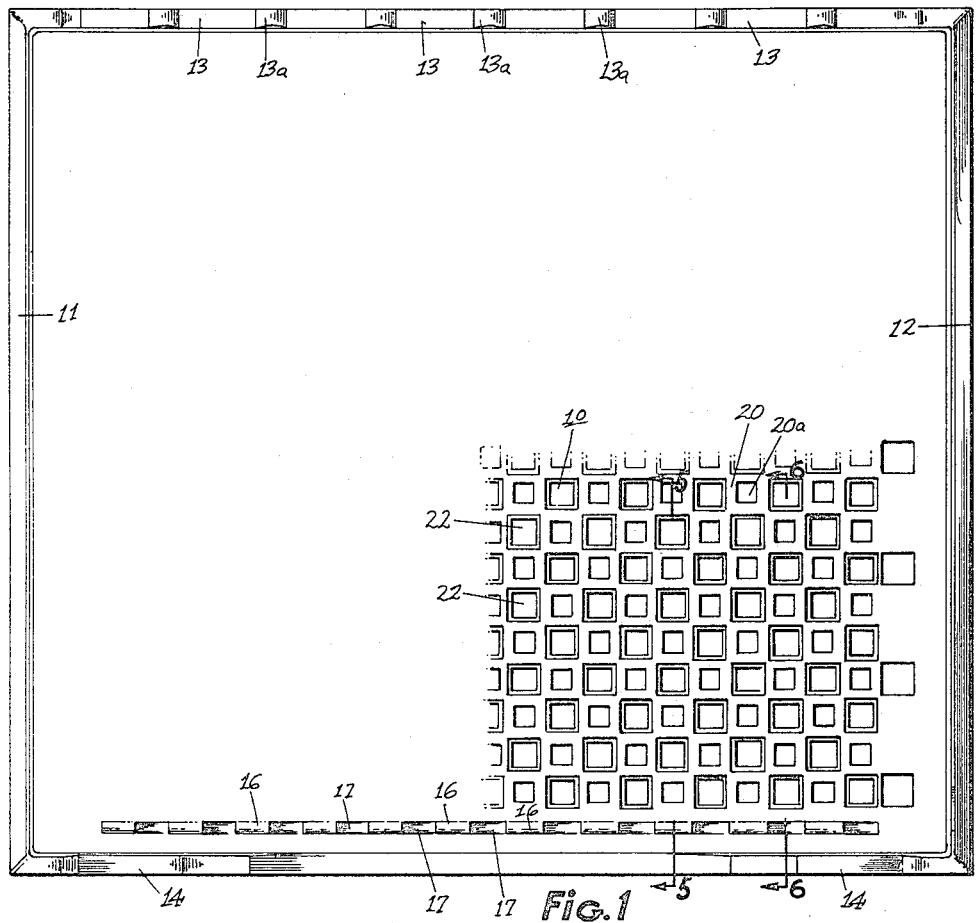
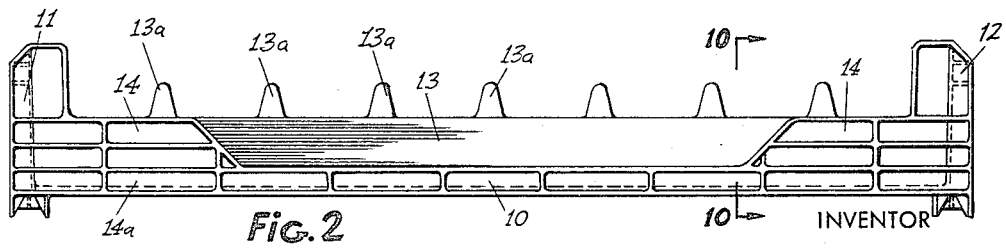
INVENTOR
KENNETH R. BOCKENSTETTE,
BY *Melville, Strasser, Foster and Hoffman*
ATTORNEYS

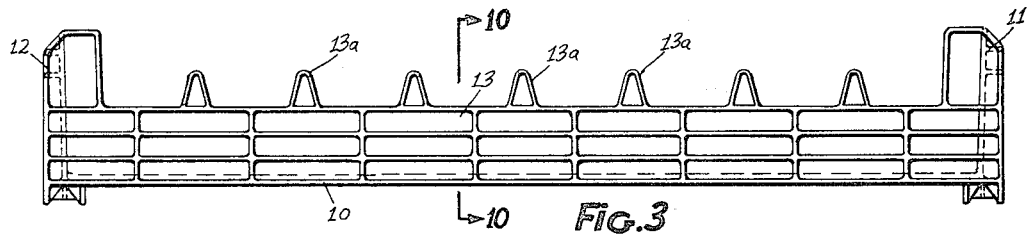
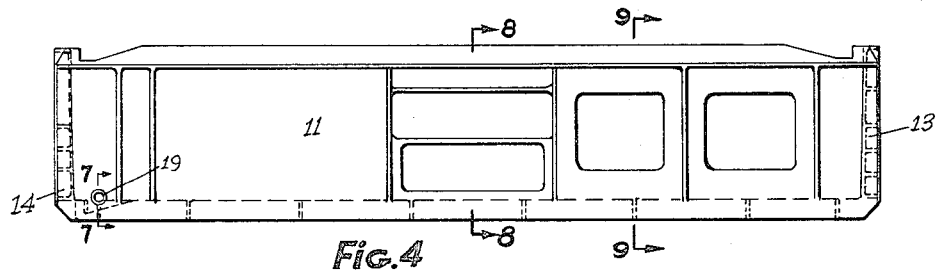
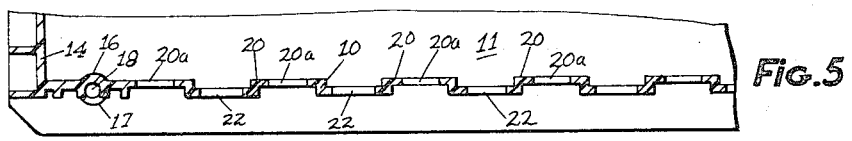
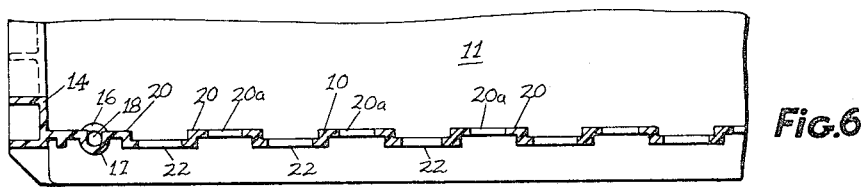
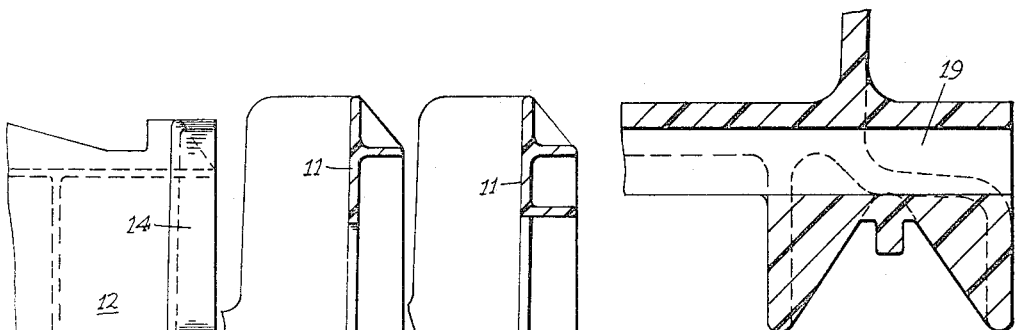
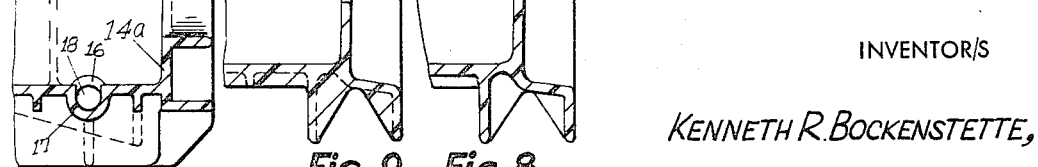

United States Patent Office
3,387,740
Patented June 11, 1968

3,387,740
REINFORCED PLASTIC BAKERY TRAY
AND THE LIKE
Kenneth R. Bockenstette, Cincinnati, Ohio, assignor to
MS Industries, Inc., Cincinnati, Ohio, a corporation of
Ohio
Filed June 22, 1967, Ser. No. 648,003
4 Claims. (Cl. 220—71)

ABSTRACT OF THE DISCLOSURE

A bakery tray of plastic and like materials having at least one low side wall such that reinforcement is required because of the absence of a beam structure. A series of semi-circular moldings are provided in the bottom adjacent the low wall, the semi-circular moldings being alternately upwardly open and downwardly open and all being disposed about a common axis with a metallic rod seated in the seat formed by said moldings.

Cross reference to related application

This application is related to a copending application in the name of Kenneth R. Bockenstette, Ser. No. 648,129, filed June 22, 1967, entitled "Stacking Tray With 90° Nesting," and the reinforcing disclosed herein is suitable for a tray according to the copending application.

Background of the invention

The invention relates to the field of molded plastic trays such as are used for the storage and transportation of bakery products and the like. In some such trays one or two sides are substantially open to permit access to goods stored on the tray when a plurality of such trays are stacked one upon the other and more specifically the invention related to reinforcement of the tray in the region of the open side. On those sides of the tray where there are substantial side walls, a beam effect is achieved which provides strength against bending by virtue of articles disposed on the tray. Such beam strength is absent where the side wall is absent and this invention relates to a reinforcement for such tray.

Summary

Along the sides of the tray having a low side wall or no side wall and where beam strength is therefore absent, the bottom of the tray is provided with a series of semi-circular moldings disposed alternately with the opening upward and the opening downward. These openings are circular about a common axis to provide in effect an elongated hole. A reinforcing rod which may be metal or other suitable material is seated in the alternately upward and downward open semi-circular moldings to reinforce the tray and make up for the absence of beam strength in the side wall.

Brief description of the drawings

FIG. 1 is a plan view of a tray according to the present invention.
FIG. 2 is an elevational view of the same as seen from the bottom of FIG. 1.
FIG. 3 is an elevational view as seen from the top of FIG. 1.
FIG. 4 is an end elevational view of the same as seen from the right of FIG. 3.
FIGS. 5 and 6 are, respectively, fragmentary cross sectional views on an enlarged scale taken on the lines 5—5 and 6—6 of FIG. 1.
FIGS. 7, 8 and 9 are fragmentary cross sectional views on an enlarged scale taken on the lines 7—7, 8—8 and 9—9 of FIG. 4 respectively; and FIG. 10 is a fragmentary cross sectional view on an enlarged scale taken on the line 10—10 of FIGS. 2 or 3.

Description of the preferred embodiment

The tray of the present invention is generally rectangular and has a bottom 10, end walls 11 and 12 and a relatively low rear wall 13 and only fragmentary front wall portions 14. The major portion of the front of the tray is open.

The bottom of the tray as illustrated herein is provided with openings for circulation of air. Alternate square portions indicated at 20 (arranged in the manner of the black squares on a checkerboard) are in the major plane of the bottom 10 and are provided with the square openings 20a. The remaining squares (which would correspond with the white squares in a checkerboard) are depressed below the level 20 and contain the square holes 22. This particular configuration does not constitute a limitation on the invention and is illustrative only.

By way of illustration also the wall 13 is shown as being provided with a plurality of upwardly extending abutments 13a to prevent goods on the tray from sliding out or falling out. It will be understood that the reinforcing hereinafter to be described may be provided for the wall 13 which is of less height than the walls 11 and 12 but that it may not be necessary because the partial wall 13 may provide sufficient beam strength for the particular use to which the tray is put. Primarily reinforcement is required in the region between the fragmentary front walls 14 where there is no wall or at best a very low wall 14a which constitutes a beam member across the front of the tray.

Regardless of whether the bottom of the tray is solid or perforated, a series of moldings are provided therein along the wall 14a and these moldings are oppositely disposed. Thus as seen in FIG. 1 alternate ones of the moldings constitute a semi-circular hump with the semi-circular opening directed downwardly as shown at 16. The intermediate moldings present a semi-circular open upwardly directed and downwardly displaced hump 17. As is clearly seen in FIGS. 5, 6 and 10, the moldings 16 and 17 are semi-circular about a common axis and provide in effect an elongated hole 18. At the two ends of the bottom and in alignment with said common axis there are provided the holes 19. Reinforcement is provided by a rod of the diameter of the holes 18 and 19 passing through the holes 19 at each end of the tray and seated in the alternately upwardly and downwardly disposed semi-circular moldings 16 and 17. This rod may be of metal or other suitable reinforcing material. The reinforcement is simple to assemble to the completely molded tray.

The tray will of course be provided with stacking elements described in more detail in the copending application above referred to but since they do not constitute a part of the present invention they will not be described further. It will be understood that numerous modifications may be made without departing from the spirit of the invention and no limitation is therefore intended which does not specifically appear in the claims which follow.

The embodiments of the invention in which an exclusive property or privilege is claimed are defined as follows:

1. In a molded plastic tray for bakery goods and the like having a low wall, a number of high walls, and a bottom, a reinforcing structure for said low wall comprising, in said bottom along the length of said low wall, a series of spaced, molded, semi-circular elements open upwardly, and alternately therewith, a series of spaced, molded, semi-circular elements open downwardly, said upwardly and downwardly open elements all being on a common axis, and together defining an elongated cylindrical seat, and a metallic rod seated in said seat.

2. A structure according to claim 1, wherein the walls adjacent said low wall are provided with a cylindrical hole in alignment with said common axis.

3. A structure according to claim 1, wherein said tray is rectangular, and has two opposed low walls, and said reinforcing structure is provided for both said low walls.

4. A structure according to claim 3, wherein the walls intermediate said low walls are provided with cylindrical holes, respectively aligned with the common axes for each of said low walls.

References Cited

UNITED STATES PATENTS

| 2,648,456 | 8/1953 | Baxter | 220—71 XR |
| 3,327,896 | 6/1967 | Asenbauer | 220—71 XR |

FOREIGN PATENTS

| 383,786 | 1/1965 | Switzerland. |

THERON E. CONDON, *Primary Examiner.*

G. E. LOWRANCE, *Assistant Examiner.*